March 15, 1960  R. A. NEWKIRK  2,928,686
UNIVERSAL BALL AND SOCKET BIND
Filed April 20, 1956
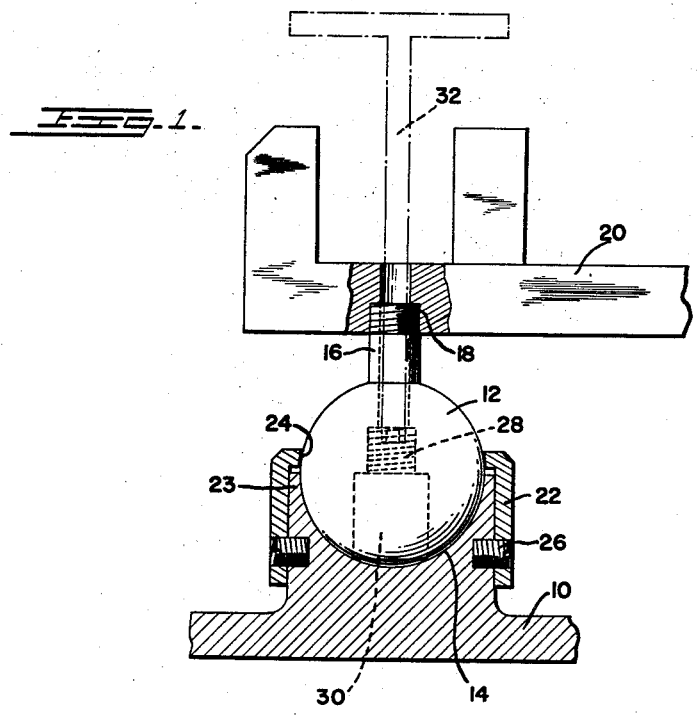
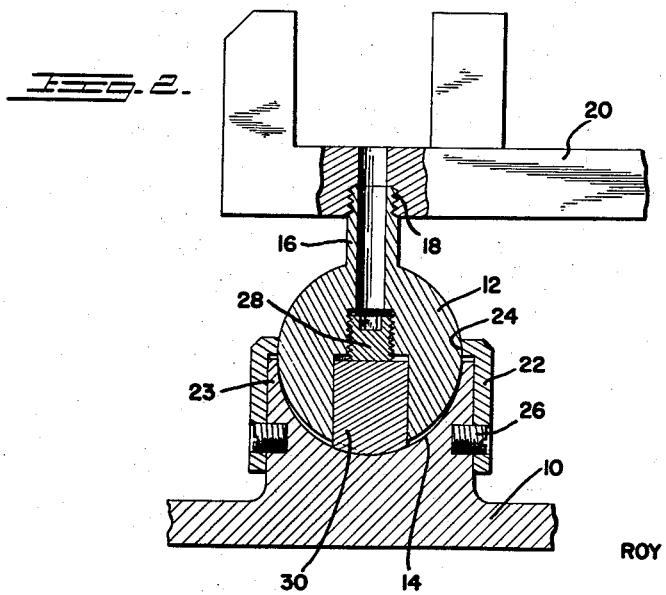
INVENTOR
ROY A. NEWKIRK
BY *H. Hamlin Hodges*
ATTORNEY

United States Patent Office 2,928,686
Patented Mar. 15, 1960

2,928,686

UNIVERSAL BALL AND SOCKET BIND

Roy A. Newkirk, Roanoke, Va.

Application April 20, 1956, Serial No. 579,590

2 Claims. (Cl. 287—12)

In the past many clamping and holding devices have been provided to hold mechanical devices in suitable prearranged positions. Those devices necessarily differ materially, their structure being primarily dependent on the mechanical device that they are designed to maintain in a desired position.

The general purpose of my invention is to provide a relatively simple mechanism to hold a mechanical (or other) device in proper position for desired use. The device is intended primarily to hold such devices as bench, drill, milling and grinding vises, scraper tables, drill press columns or any other device which may preferably be held in any desired plane from, and including, horizontal to an angle greater than forty five (45°) degrees from horizontal. The holding device may also be turned three hundred and sixty (360°) degrees regardless of the angle of inclination at which the device is to be held.

An object of my invention is to provide a universal ball and socket bind adapted to hold a mechanical element supporting device in any desired position from, and including, horizontal to any angle to and including one greater than forty five (45°) degrees from horizontal.

A further object is to provide a universal ball and socket bind which may hold a mechanical device at any angle to and including one greater than forty five (45°) degrees from horizontal to, and including, horizontal, and also to be turned into any position in three hundred and sixty (360°) degrees.

An even further object is to provide a universal ball and socket bind that may be secured in its adjusted position by expanding a portion of the ball.

Other objects will become apparent from the description of the ball and socket bind in the following specification.

In the drawings:

Figure 1 is a view in front elevation, and partly in vertical cross section, showing the ball free to move within its socket, and Figure 2 is a view in vertical cross section showing the ball in its secured position within the socket.

The socket member 10 of the ball and socket bind may be suitably attached to any desired base. The ball portion 12 of the ball and socket bind is of a diameter slightly less than the diameter of the approximately semispherical socket 14 so that it may be seated therein with ample commercial tolerance. Extending outwardly from the ball 12 I provide a hollow neck 16 which has on its end remote from the ball suitable screw-threads 18. The screw-threads 18 on the neck 16 may be screwed into suitable female threads extending inwardly from the under surface of the vise base 20, or the base of any other desired mechanical element which is to be held in an adjusted position.

A collar 22 is adapted to encircle the upstanding portion 23 of the socket member 10, and is provided with a circular opening 24, the internal diameter of which is less than the diameter of the ball 12. After the ball 12 has been placed within the approximately semi-spherical socket 14, the collar 22 is placed thereover and also around the upstanding portion 23 of the socket member 10, to which it is secured by the set screws 26. With the ball and socket thus assembled there will be commercial tolerance between the ball 12, the semi-spherical socket 14, and the collar 22.

The hollow neck 16 is in communication and alignment with a hollowed out portion of the ball 12. A portion of the hollowed out portion of the ball is screw-threaded to encase an Allen screw 28. Within the hollowed out portion of the ball 12 I provide a slidable plug 30 which is in contact with the Allen screw 28. A suitable hole is drilled through the base of the vise 20 in direct alignment with the hollow neck 16 and the Allen screw 28. By the use of an Allen screw driver, or wrench, the screw 28 may be activated to force the sliding plug 30 into close contact with the socket 14 and force the ball 12 into tight contact with the circular opening 24 of the collar 22.

With the ball 12 tightly secured to the base 20, and with the ball positioned within the socket as disclosed in Figure 1 and described above, it will be understood that the base 20 and its associated elements may be moved into any desired position (within limits controlled by the neck 16 coming into contact with the circular opening 24 of the collar 22). When the vise or other mechanical device has been positioned as desired, an Allen screw driver is inserted into the socket of the screw 28 so that it may be activated to force the plug 30 into close contact with the socket 14 and consequently urge the ball 12 into tight contact with the circular opening 24 of the collar 22. Thus, all motion of the ball 12 within its socket 14 will be stopped, and the vise 20 will be maintained in its desired, and adjusted, position for use.

It will be understood that various minor changes may be made from time to time in the exact construction of the universal ball and socket bind without departing from the spirit of the invention and the scope of the appended claims.

I claim:

1. In a universal ball and socket bind, a semi-spherical socket, a ball fitting freely within said socket, a collar secured around said socket and adapted to hold said ball within said socket, a hollow neck extending from said ball in alignment with a hollowed out portion of said ball, and screw-threaded means and a slidable plug within the said hollowed out portion adapted to expand the perimeter of said ball and frictionally hold it in adjusted position.

2. In a universal ball and socket bind, a semi-spherical socket, a ball fitting loosely within said socket, a neck extending from said ball, means on the end of said neck for securing the same to a mechanical element, a collar secured around said socket and adapted to hold said ball within said socket, and slidable plug means and screw-threaded means abutting said plug means within said ball and adapted to expand the perimeter of said ball and frictionally hold the same in an adjusted position within said socket.

References Cited in the file of this patent

UNITED STATES PATENTS

| 245,659   | Renner _____ Aug. 16, 1881 |
| 585,549   | Atwater et al. _____ June 29, 1897 |
| 1,379,382 | Bergstedt _____ May 24, 1921 |
| 2,632,660 | Krauthomer _____ Mar. 24, 1953 |
| 2,657,944 | Miller _____ Nov. 3, 1953 |
| 2,673,054 | Slavik _____ Mar. 23, 1954 |

FOREIGN PATENTS

| 1,023,077 | France _____ Dec. 24, 1952 |